United States Patent
Doi

(10) Patent No.: US 10,652,167 B2
(45) Date of Patent: May 12, 2020

(54) PACKET SWITCH DEVICE AND MESSAGE EXCHANGE SYSTEM

(71) Applicant: Preferred Networks, Inc., Tokyo (JP)

(72) Inventor: Yusuke Doi, Tokyo (JP)

(73) Assignee: PREFERRED NETWORKS, INC., Tokyo (JP)

( * ) Notice: Subject to any disclaimer, the term of this patent is extended or adjusted under 35 U.S.C. 154(b) by 43 days.

(21) Appl. No.: 15/879,105

(22) Filed: Jan. 24, 2018

(65) Prior Publication Data

US 2018/0219799 A1    Aug. 2, 2018

(30) Foreign Application Priority Data

Jan. 24, 2017    (JP) .................................. 2017-010381

(51) Int. Cl.
*H04L 12/947* (2013.01)
*H04L 12/18* (2006.01)
*H04L 12/46* (2006.01)

(52) U.S. Cl.
CPC ............. *H04L 49/25* (2013.01); *H04L 12/18* (2013.01); *H04L 12/1877* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 9,088,533 B1* | 7/2015 | Zeng | G06Q 10/107 |
| 9,171,089 B2* | 10/2015 | Gross | H04L 65/4069 |
| 2006/0168059 A1* | 7/2006 | Chang | G06Q 10/107 |
| | | | 709/206 |
| 2010/0274861 A1* | 10/2010 | Asiedu | H04L 51/28 |
| | | | 709/206 |

(Continued)

FOREIGN PATENT DOCUMENTS

| JP | 2004-147230 | 5/2004 |
|---|---|---|
| JP | 2004-147230 A | 5/2004 |

OTHER PUBLICATIONS

Cain et al., "Internet Group Management Protocol, Version 3," (Oct. 2002) Available online, URL: <https://tools.ietf.org/html/rfc3376>.

(Continued)

*Primary Examiner* — Lonnie V Sweet
(74) *Attorney, Agent, or Firm* — Foley & Lardner LLP

(57) ABSTRACT

A packet switch device for a message exchange among a plurality of computing devices, including a message transceiver transmitting and receiving a message, a transmission table storage unit storing a transmission table for determining a computing device to which the message is transmitted, a transmission processor determining the computing device to which the message is transmitted based on a topic address included in the message, a reference processing information receiver receiving a usage status that indicates information used in a calculation process in the computing device, a transmission table compatibility calculation unit calculating compatibility of the transmission table based on the received (Continued)

reference processing information, and a transmission table update unit that updates the transmission table based on the calculated compatibility.

20 Claims, 5 Drawing Sheets

(56) References Cited

U.S. PATENT DOCUMENTS

| | | | |
|---|---|---|---|
| 2011/0026687 A1* | 2/2011 | Smelyansky | H04L 12/66 379/45 |
| 2016/0255166 A1* | 9/2016 | Piccinini | H04L 51/22 709/206 |
| 2018/0212908 A1* | 7/2018 | Knudson | H04L 51/08 |

OTHER PUBLICATIONS

Graves et al., "Hybid computing using a neural network with dynamic external memory," Nature vo. 538 (Oct. 27, 2016) Available online, URL: <https://www.nature.com/articles/nature20101.epdf?author_access_token=ImTXBI8aWbYxYQ51Plys8NRgN0jAjWek=l9jnR3ZoTv0MggmpDmwljGswxVdeocYSurJ3hxupzWuRNeGvvCnoO8o4jTJncAyhGuZzXJ1GEaD-Z7E6X_a9R-xqJ9TfJWBqz>.

Graves et al., "Neural Turing machines," arXiv (Dec. 10, 2014), Available online, URL: <https://arxiv.org/pdf/1410.5401.pdf>.

Jaderberg et al., "Decoupled Neural interfaces using Snythetic Gradients," arXiv, (Jul. 3, 2017) Available online, URL: <https://arxiv.or/pdf/1608.05343.pdf>.

Vida et al., "Multicast Listener Discovery Version 2 (MLDv2) for IPv6," (Jun. 2004), Available online, URL: <https://tools.ietf.org/html/rfc3810>.

* cited by examiner

| TOPIC ADDRESS | COMPUTING DEVICE | | | | | | | |
|---|---|---|---|---|---|---|---|---|
| | C1 | C2 | C3 | C4 | ... | C(V-2) | C(V-1) | CV |
| $a_1$ | 1 | 0 | 1 | 1 | ... | 0 | 0 | 1 |
| $a_2$ | 0 | 0 | 1 | 0 | ... | 1 | 0 | 1 |
| $a_3$ | 1 | 1 | 0 | 1 | ... | 1 | 1 | 0 |
| ... | | | | | | | | |
| $a_{n-2}$ | 1 | 1 | 1 | 0 | ... | 0 | 0 | 0 |
| $a_{n-1}$ | 0 | 1 | 0 | 1 | ... | 0 | 1 | 1 |
| $a_n$ | 0 | 1 | 1 | 1 | ... | 1 | 1 | 0 |

FIG. 2

INDIVIDUALLY DESCRIBED REFERENCE PROCESSING INFORMATION  Table.1

| COMPUTING DEVICE ID | TOPIC ID | STATE | TIME |
|---|---|---|---|
| 1 | 40 | hit | 2016-12-21 08:19:01 |
| 1 | 38 | stale | 2016-12-22 18:20:04 |

FIG 5

AGGREGATED REFERENCE PROCESSING INFORMATION  Table.2

| COMPUTING DEVICE ID | TOPIC ID | hit | stale | miss |
|---|---|---|---|---|
| 1 | 1 | 2 | 1 | 0 |
| 1 | 2 | 0 | 0 | 1 |
| 1 | 3 | 0 | 0 | 0 |

FIG. 6

PACKET SWITCH DEVICE AND MESSAGE EXCHANGE SYSTEM

CROSS-REFERENCE TO RELATED APPLICATIONS

This application claims priority to Japanese Patent Application No. 2017-010381 filed on Jan. 24, 2017 and entitled "Packet Switch Device and Message Exchange System," which is assigned to the assignee of the present application.

TECHNICAL FIELD

Embodiments relate to a packet switch device for distributing packets to a plurality of connected computing devices and a message exchange system.

BACKGROUND

Conventionally, a packet switch device for distributing packets to a plurality of connected computing devices has been used. The packet switch device can perform transmission by unicast in which a computing device corresponding to a sending destination is designated, transmission by broadcast to all connected computing devices, and transmission by multicast to a plurality of computing devices of a determined group.

JP 2004-147230A discloses a packet switch capable of preventing discarding of an important network control packet without a transmission speed of a packet being restricted depending on the output line at the time of distributing a multicast packet, and maintaining fairness of transmission of a plurality of multicast groups, and a multicast transmission method thereof.

There has been no simple method of dynamically and efficiently setting a transmission destination corresponding to a topic address when a message sent from a certain computing device to a plurality of virtual destinations (hereinafter referred to as topic addresses) is sent toward one or a plurality of computing devices connected to a switch transmitting the message.

In the case of sending to all computing devices by broadcast, transmission is performed with respect to an unintended computing device, and thus there is a problem that a band is wasted. In addition, in the case of performing transmission by unicast as many times as the number of transmission destinations, destination management for each topic address is dispersed and complicated. Furthermore, since transmission needs to be performed a plurality of times, there is a problem that a band on the sending side is wasted. Further, in the case of sending data after setting L2/L3 multicast and a virtual local area network (VLAN) domain, it is difficult to manage the number corresponding to the huge number of topic addresses, for example, $2^{16}$ topic addresses.

SUMMARY OF EMBODIMENTS

Embodiments of the invention have been made in view of the above problems, and an object of the invention is to provide a packet switch device capable of effectively utilizing a band and dynamically and efficiently setting a transmission destination corresponding to a topic address and a message exchange system.

A packet switch device according to embodiments is a packet switch device used for a message exchange performed among a plurality of connected computing devices, including a message transceiver that transmits and receives a message to and from the computing devices, a transmission table storage unit that stores a transmission table for determining a computing device to which the message is transmitted, a transmission processor that performs a transmission process by determining the computing device to which the message is transmitted with reference to the transmission table based on a topic address included in the message, a reference processing information receiver that receives reference processing information indicating a usage status that indicates information used in a calculation process in the computing device from the computing device, a transmission table compatibility calculation unit that calculates compatibility of the transmission table based on the received reference processing information, and a transmission table update unit that updates the transmission table based on the calculated compatibility of the transmission table.

In addition, the packet switch device according to the embodiments is characterized in that the reference processing information includes information about an evaluation of the calculation process in the computing device, and the transmission table compatibility calculation unit calculates compatibility of the transmission table based on the reference processing information including the information about the evaluation.

In addition, the packet switch device according to the embodiments is characterized in that the transmission table compatibility calculation unit causes a learning device according to a neural network to perform learning based on the reference processing information and calculates compatibility of the transmission table using the learning device finishing learning.

A message exchange system according to the embodiments is a message exchange system for performing a message exchange with a plurality of computing devices via a packet switch device, including the plurality of computing devices, and the packet switch device to which the plurality of computing devices is connected, in which the computing device includes a message transceiver that transmits and receives a message to and from the packet switch device, a storage unit that stores information used for a calculation process, the information corresponding to each topic address included in the message, a reference processing information generator that generates a usage status of the information stored in the storage unit as reference processing information, and a reference processing information transmitter that transmits the reference processing information to the packet switch device, and the packet switch device includes a message transceiver that transmits and receives a message to and from the computing devices, a transmission table storage unit that stores a transmission table for determining a computing device to which the message is transmitted, a transmission processor that performs a transmission process by determining the computing device to which the message is transmitted with reference to the transmission table based on a topic address included in the message, a reference processing information receiver that receives the reference processing information from the computing device, a transmission table compatibility calculation unit that calculates compatibility of the transmission table based on the received reference processing information, and a transmission table update unit that updates the transmission table based on the calculated compatibility of the transmission table.

In addition, the message exchange system according to the embodiments is characterized in that the reference processing information includes information about an evaluation of the calculation process in the computing device, and the transmission table compatibility calculation unit calculates compatibility of the transmission table based on the reference processing information including the information about the evaluation.

In addition, the message exchange system according to the embodiments is characterized in that the transmission table compatibility calculation unit causes a learning device according to a neural network to perform learning based on the reference processing information and calculates compatibility of the transmission table using the learning device finishing learning.

According to a packet switch device and a message exchange system according to the embodiments, since a message of a certain topic address is transmitted only to a computing device using the message, and the message of the topic address is not transmitted to a computing device not using the message, it is possible to prevent generation of a wasteful message transmission process. In addition, it is possible to provide a scheme of dynamically and efficiently setting a transmission destination corresponding to a topic address. In addition, it is possible to efficiently utilize a backplane of a switch by actively using multicast rather than unicast. In addition, even when sending to a computing device is performed by broadcast, it is possible to reduce transmission to a destination to which sending should not be performed. In addition, even when sending to a computing device is performed by broadcast, a band is not wasted. In addition, even in the case of using conventional L2/L3 multicast and a VLAN domain, a huge number of topic addresses may not be managed. In addition, even when the same hardware (particularly inexpensive Ethernet hardware) is used, it is possible to realize more sophisticated distributed learning.

BRIEF DESCRIPTION OF THE DRAWINGS

In the following drawings like reference numerals designate like structural elements. Although the figures depict various examples, the one or more embodiments and implementations described herein are not limited to the examples depicted in the figures, in which:

FIG. 2 is an explanatory diagram illustrating an example of a transmission table;

FIG. 5 is a table illustrating individually described reference processing information in an example embodiment; and FIG. 6 is a table illustrating aggregated reference processing information in an example embodiment.

DETAILED DESCRIPTION

Figure 1:
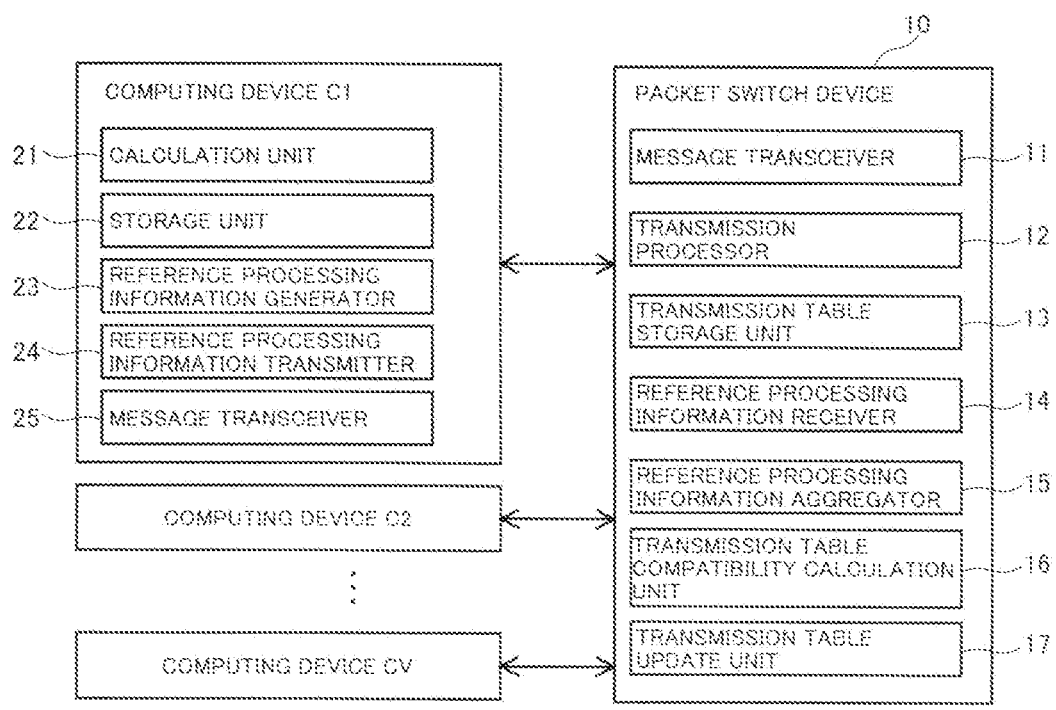
FIG. 1 is a block diagram illustrating a configuration of a packet switch device according to the invention and a configuration of a connected computing device.

Hereinafter, a description will be given of a packet switch device 10 according to the invention with reference to drawings. FIG. 1 is a block diagram illustrating a configuration of the packet switch device 10 according to the invention and a configuration of a connected computing device. Referring to a configuration of FIG. 1, for example, it is presumed that even though a computing device performs application computation, parallelization is performed since a single computing device has difficulty in achieving the application computation due to performance/capacity constraints, and the packet switch device 10 is used to connect a plurality of parallelized computing devices C1, C2, . . . , CV. A message exchange system includes the packet switch device 10 and the plurality of connected computing devices C1, C2, . . . , CV. As an example of a conceivable configuration, it is presumed that the plurality of parallelized computing devices C1, C2, . . . , CV is connected to the packet switch device 10 to function as a key value store. In addition, it is presumed that a neural network such as a differentiable neural computer (DNC) is constructed by connecting the plurality of computing devices C1, C2, . . . , CV using the packet switch device 10.

The packet switch device 10 includes at least a message transceiver 11, a transmission processor 12, a transmission table storage unit 13, a reference processing information receiver 14, a reference processing information aggregator 15, a transmission table compatibility calculation unit 16, and a transmission table update unit 17.

The message transceiver 11 has a function of receiving messages from the plurality of connected computing devices C1, C2, . . . , CV and transmitting the received messages to another computing device. Here, a message in the invention refers to a message including an address (number) referred to as a topic address not associated with a calculator and a message body portion having a variable length or a fixed length. For example, the message may correspond to a memory write message in a key-value store (KVS) or an output from a write head in a case in which a neural network such as a DNC is included in a calculation unit.

The transmission processor 12 has a function of determining a transmission destination of a message received by the message transceiver 11. Specifically, the transmission processor 12 determines a computing device to which the message is transmitted with reference to a transmission table described below using a topic address included in the message.

The transmission table storage unit 13 has a function of storing a transmission table as a table having information for determining a computing device corresponding to a destination of transmission based on a topic address.

The reference processing information receiver 14 has a function of receiving reference processing information generated by a computing device. The reference processing information is information indicating a usage status of information corresponding to each topic address when the computing device performs calculation, and information transmitted from each connected computing device is received by the reference processing information receiver 14. In addition, the reference processing information may include evaluation of a calculation result based on use or nonuse of information corresponding to each topic address. In addition, the reference processing information may include a flag (for example, a stale value) indicating whether information referred to by a computing device is latest information, etc. Since whether referred information is latest information is not known at the time of referring to the information by the computing device and determined afterwards, the flag is set afterwards.

For example, the reference processing information received by the reference processing information receiver 14 has a log format. The log format is a format including logs such as a topic address, information of which is referred to, a time at which the information is referred to, etc. Such a log format is simple since reference processing information is determined only based on whether reference is allowed. For example, in addition to the log format, the reference processing information may include a derivative value (gradient) in a memory reference value with respect to an evaluation value of a calculation result based on the reference or an evaluation value used in back propagation of a neural network. In addition, a plurality of reference results may be aggregated. For example, it is possible to share a model of a synthetic derivative (synthetic gradient) between a computing device and an aggregating device, and convey the reference processing information in the form of parameter update of the synthetic derivative.

The reference processing information aggregator 15 has a function of aggregating reference processing information transmitted from each of the connected computing devices. The reference processing information transmitted from each of the connected computing devices is information as to whether the computing device has referred to information corresponding to a topic address in a calculation process. However, when this information is aggregated with respect to all the computing devices connected to the packet switch device 10, the information may be aggregated as information indicating a computing device referring to the information corresponding to the topic address and a computing device not referring to the information corresponding to the topic address.

The transmission table compatibility calculation unit 16 has a function of calculating a compatibility gradient of the transmission table as to whether a message corresponding to a topic address needs to be transmitted based on the reference processing information aggregated by the reference processing information aggregator 15.

Various schemes can be conceived for calculation of compatibility by the transmission table compatibility calculation unit 16. For example, information about the number of times of reference by a computing device (node) for each topic address is extracted based on the aggregated reference processing information, and a result is evaluated by the transmission table compatibility calculation unit 16 collectively using information about a computing device to which an individual message is transmitted, a current value of the transmission table, information about the number of times of transmission for each topic address, etc. Evaluation here may be arbitrarily set according to the purpose of packet transmission as a loss function of a neural network. For example, when information transmitted by the transmission table is referred to and used for calculation by a computing device, gain with respect to transmission is obtained. When the information is not used for calculation (in the case of wasteful transmission), a loss is given. Meanwhile, when calculation using the corresponding topic is performed despite the fact that transmission has not been performed, and a calculation result is excellent, gain for not performing transmission is obtained. When the result is poor, a loss for not performing transmission is given. The gain/loss may be calculated by propagating a gradient from a computing device or calculated by a simple rule based. A compatibility gradient of each item of the transmission table is obtained based on the gain/loss obtained as described above.

In addition, calculation of compatibility by the transmission table compatibility calculation unit 16 may correspond to obtaining of a compatibility gradient using a learning device according to a neural network. In this case, the learning device calculates a compatibility gradient of each item of the transmission table by setting information about a transmission history based on content of the transmission table and presence/absence of actual reference in a computing device as a base of training data and additionally setting information about evaluation of a calculation result included in the reference processing information as the training data, and compares this information with an actual transmission history, thereby modifying a parameter to perform learning. Such learning may be performed in advance, or successive learning may be performed to increase accuracy of the learning device.

In addition, calculation of compatibility by the transmission table compatibility calculation unit 16 may be periodically performed every preset period, or a gradient may be recalculated each time new data arrives and calculation may be performed in real time at an elapsed time based on the gradient. In an implementation in which the transmission table has a binary value, an evaluation value for calculating the transmission table may be controlled by the above-described gradient, and transmission or non-transmission may be switched according to a threshold value.

The transmission table update unit 17 has a function of updating the transmission table based on information about a compatibility gradient calculated by the transmission table compatibility calculation unit 16.

Each of the computing devices C1, C2, . . . , CV includes at least a calculation unit 21, a storage unit 22, a reference processing information generator 23, a reference processing information transmitter 24, and a message transceiver 25.

The calculation unit 21 has a function of performing calculation according to an arbitrary purpose and performing calculation with reference to information stored in the storage unit 22 as necessary.

The storage unit 22 has a function of storing information necessary for calculation by the calculation unit 21. The storage unit 22 may not only write information based on a calculation result of the calculation unit but also rewrite information stored in a form corresponding to a topic address in accordance with a message from another computing device (another node).

The reference processing information generator 23 has a function of generating reference processing information indicating a usage status that indicates information used when calculation is performed by the calculation unit 21 among information items corresponding to respective topic addresses stored in the storage unit 22. In addition, in some cases, information about evaluation of a calculation result based on use or nonuse of information corresponding to each topic address may be also generated as the reference processing information.

The reference processing information transmitter 24 has a function of transmitting the reference processing information generated by the reference processing information generator 23 to the packet switch device 10.

The message transceiver 25 has a function of receiving a message from the packet switch device 10 and transmitting a message to the packet switch device 10.

FIG. 2 is an explanatory diagram illustrating an example of the transmission table. As illustrated in FIG. 2, the table shows a determination as to whether to transmit a message corresponding to a topic address to the connected computing devices C1 to CV with regard to each of the topic addresses $a_1$ to $a_n$. In FIG. 2, "0" is allocated to a computing device to which transmission does not need to be performed, and "1" is allocated to a computing device to which transmission needs to be performed. However, binary values of "0" and "1" do not have to be used for management, and it is possible to use a stochastic value based on a floating point number of 0.0 to 1.0, a discrete value expressing a probability by several bits, etc. When a display format of the transmission table corresponds to a stochastic value, a scheme may be conceived in which messages are stochastically transmitted to the respective computing devices.

Figure 3:
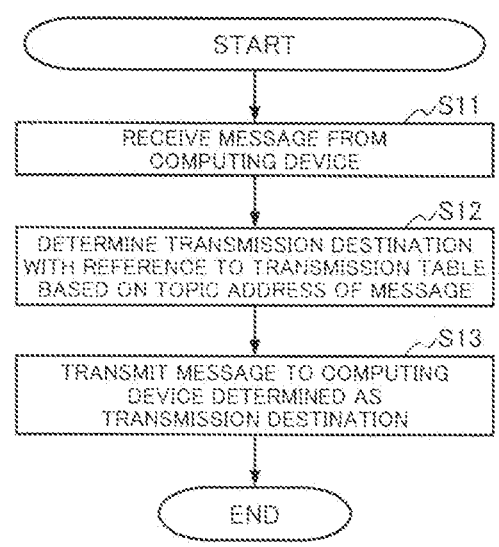
FIG. 3 is a flowchart illustrating a flow of a transmission process in the packet switch device.

Next, a description will be given of a flow of a transmission process in the packet switch device 10 according to the invention. FIG. 3 is a flowchart illustrating a flow of a transmission process in the packet switch device 10. In FIG. 3, the transmission process starts by receiving a message from a computing device in a state in which a plurality of computing devices is connected to the packet switch device 10 (step S11). Since the received message includes a topic address, a computing device to which the message is transmitted is determined with reference to the transmission table using the topic address (step S12). Then, the message is transmitted to a computing device determined as a transmission destination of the message (step S13), and the transmission process is ended.

Figure 4:
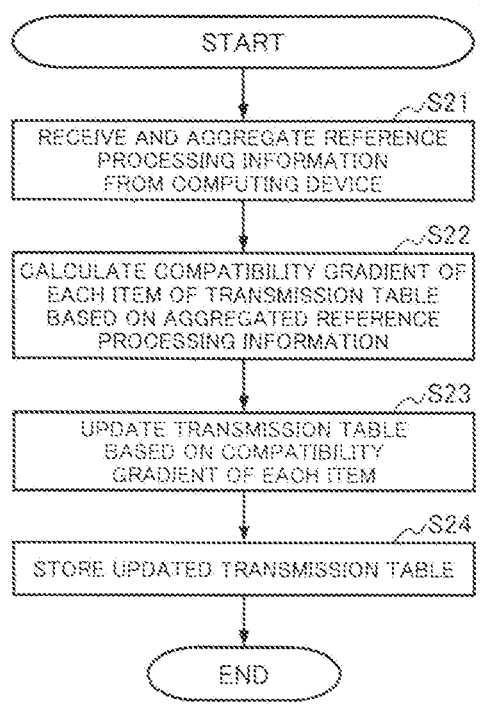
FIG. 4 is a flowchart illustrating a flow of a process of updating a transmission table in the packet switch device.

Next, a description will be given of a flow of a process of updating a transmission table in the packet switch device 10 according to the invention. FIG. 4 is a flowchart illustrating the flow of the process of updating the transmission table in the packet switch device 10. In FIG. 4, the process of updating the transmission table starts by receiving reference processing information from a connected computing device. Reference processing information items from a plurality of computing devices are received and aggregated (step S21). A compatibility gradient of each item of the transmission table is calculated based on the aggregated reference processing information items (step S22). Here, each item of the transmission table refers to an item corresponding to each computing device, and a compatibility gradient corresponding to appropriateness of transmission is calculated for each computing device. Subsequently, the transmission table is updated such that compatibility is improved based on the compatibility gradient of each item (step S23). Finally, the updated transmission table is stored (step S24), and the process of updating the transmission table is ended.

As described above, according to the packet switch device 10 according to the embodiments, it is possible to obtain the following effects (denoted e.g., 1-7).

(1) Since a message of a certain topic address is transmitted only to a computing device using the message, and the message of the topic address is not transmitted to a computing device not using the message, it is possible to prevent generation of a wasteful message transmission process.

(2) It is possible to provide a scheme of dynamically and efficiently setting a transmission destination corresponding to a topic address.

(3) It is possible to efficiently utilize a backplane of a switch by actively using multicast rather than unicast.

(4) Even when sending to a computing device is performed by broadcast, it is possible to reduce transmission to a destination to which sending should not be performed.

(5) Even when sending to a computing device is performed by broadcast, a band is not wasted.

(6) Even in the case of using conventional L2/L3 multicast and a VLAN domain, a huge number of topic addresses do not have to be managed.

(7) Even when the same hardware (particularly inexpensive Ethernet hardware) is used, it is possible to realize more sophisticated distributed learning.

Specific Example 1 of Calculation of Compatibility: Case of KVS

A description will be given of a specific example of calculation of compatibility by the transmission table compatibility calculation unit 16 in the case of the KVS. In the KVS, reference processing information is classified as follows.

Hit: Case of having an appropriate value for a key and the value is inquired
Miss: Case of not having a value for a key
Stale: Case of having an old value for a key FIG. 5 is a table (Table 1) illustrating an example of reference processing information. Here, a computing device having a computing device identifier of 1 is targeted. However, reference processing information is generated by each of the computing devices and aggregated by the reference processing aggregator. In Table 1 of FIG. 5, only two entries are shown. However, in practice, a plurality of entries is generated. Discrimination between a stale and a hit is performed by an inquiry to a computing device corresponding to a master of a key of the KVS after referring to the storage unit.

In addition, in the case of this table form, reference processing information becomes huge. As a result, a load is applied to a storage device or communication, and thus reference information may be aggregated as in Table 2 of FIG. 6 at constant time intervals on a computing device side or a switch device side. Here, for the sake of illustration, only some entries are shown.

FIG. 6 illustrates a table (Table 2) of aggregated reference processing information under an example embodiment. As shown in FIG. 6, when all hit/stale/miss correspond to 0 as in a row of topic ID=3, transmission from the reference processing transmitter to the reference processing receiver may be omitted.

The reference processing aggregator holds reference processing information received from each computing device, which corresponds to the same format as that of the above "aggregated reference processing information". However, with regard to information received from each computing device, latest one may be retained, aggregation may be performed for a set of each computing device ID/topic ID, or a moving average may be obtained in a certain form. It is possible to use an exponential moving average having a small amount of calculation or memory consumption.

The transmission table compatibility calculation unit 16 performs optimization calculation with respect to an aggregated result (aggregated reference information). As an example of optimization calculation, policies below are shown (denoted e.g., A-D).

(A) It is advantageous when the number of bits of the transmission table is as uniform as possible (certain transmission is inhibited from occupying a significant band). However, there is no problem as to presence of an outlier in smaller directions.

(B) It is advantageous when the number of bits of the transmission table is small (it is excellent to narrow a transmission destination).

(C) Occurrence of stale needs to approach zero.

(D) Occurrence of miss is lowered as much as possible and acceptable.

Here, the transmission table may be optimized by the following schemes (denoted e.g., a-f).

(a) A transmission table bit for a master of each topic address is 1 at all times (constraint: 1 regardless of the following operation).

(b) Two threshold values of the number of bits corresponding to 1 in the transmission table are prepared (t1, t2; t1<t2).

(c) Aggregate reference information is sorted in order of the total of stale/hit/miss.

(d) Until the total number of bits set to 1 in the transmission table falls below a threshold value t1 determined in advance, bits corresponding to low sum values are successively set to 0.

(e) Aggregate reference information is sorted in stale order.

(f) Until the total number of bits set to 1 in the transmission table exceeds a threshold value t2 determined in advance, bits having a large number of stales are set to 1 from a bit corresponding to 0 in the transmission table.

In the case of the KVS, it is advantageous to aggregate related topics for each computing device in a certain form, and thus it is effective to use something like Locality-Sensitive Hash when a topic address is generated from a key of content.

When optimization by certain numerical calculation is performed, an objective function is defined as follows:

$$Loss = Cx + Cs$$

Here, Cx denotes the total number of bits corresponding to 1 in the transmission table, and Cs denotes the total count number corresponding to stale. For example, the transmission table compatibility calculation unit 16 and the transmission table update unit 17 may learn a bit to be set to 1 and a bit to be set to 0 so that loss can be minimized using learning based on the neural network (specifically reinforcement learning). During the reinforcement learning, a state corresponds to aggregate reference information, and an action corresponds to update of the transmission table.

Specific Example 2 of Calculation of Compatibility: Case of Extension of DNC

A description will be given of a specific example of calculation of compatibility in the transmission table compatibility calculation unit 16 in the case of the DNC. In a neural network such as Differentiable Neural Computer (e.g., Graves et. al., Hybrid computing using a neural network with dynamic external memory, Nature), network_head is prepared similarly to write_head. Data written by network_head is transmitted to another computing device by the transmission table. In training of the neural network, a loss is calculated with respect to a training result, a gradient with respect to the loss is propagated by tracing a calculation process, and a parameter is finally updated according to the gradient (Stochastic Gradient Decent and derivation thereof). Here, as performed by the DNC, etc., a gradient may be calculated by calculation via the storage unit. However, when computing devices are out of synchronization, there is a possibility that a state of the storage unit at the time of performing calculation in a forward direction may not match a state of the storage unit at the time of performing calculation in a reverse direction, and thus a generation of content of the storage unit may be managed and recorded to improve accuracy of calculation. Further, since transfer of data between storage units between computing devices is performed by the transmission table, it is possible to prepare a transmission table in which a generation is similarly managed.

More specifically, a network write key corresponding to a write key (a value corresponding to content performing writing) of the DNC is generated by a neural network included in a certain computing device, and this key is mapped to a topic address by certain calculations (for example, cosine similarity with respect to a random key determined in advance for each topic address) and sent to a switch device by the message transceiver together with a message ID, a write vector, an erase vector, write strength, etc. The write vector, the erase vector, and the write strength may be the same as the DNC and may be generated by separately extending a neural network output. The switch device transmits a message to one or a plurality of corresponding computing devices in a deterministic manner (when the transmission table corresponds to a binary value of 0 or 1) or a stochastic manner (when the transmission table corresponds to a probability in a range of [0, 1]) with reference to the transmission table. The computing device receiving the message updates the storage unit included in the computing device according to a given value. In this instance, when the neural network is undergoing training, and when a value is updated with a number by a message having an ID, a value is referred to by calculation, and a loss is calculated as a result, the ID, the value, the number, the calculation, the value referred to, and a scheme of calculating the loss including a calculation process are recorded as a reference processing record.

When mutual calculation is performed, and the memory is updated as described above, a calculation graph is dispersed among devices and constructed. The reference processing transmitter transmits this calculation graph to the switch device periodically or by a certain trigger, and aggregates the graph. Since a gradient of each value of the transmission table in the training can be calculated from an aggregated calculation result, the gradient is calculated and updated so that a total loss value is decreased.

For example, from the reference processing receiver to the transmission process update unit of the switch device may correspond to an external device such as an SDN controller. In this case, a reference table of the switch is updated with an interface such as OpenFlow, etc.

In the above embodiment, a transmission capacity with respect to a certain topic address is not considered in calculation by the transmission table compatibility calculation unit 16. However, during calculation of compatibility, it is possible to add a constraint to reduce a sum of a list of transmission destinations corresponding to a certain topic address (a sum of the number of times of packet transmission) to a certain value or less. In this way, it is possible to promote efficient use of a backplane capacity of the packet switch device 10.

In addition, it is possible to add a constraint to reduce a column in the transmission table (a list of topic addresses corresponding to a certain port) to a certain value or less. In this way, it is possible to suppress a phenomenon in which a specific port is occupied by a lot of transmission and to promote efficient use of a backplane capacity of switch hardware.

In the above embodiment, a transmission process directly is switched by a transmission table and this transmission table is updated. Meanwhile, even when switching of an output by a neural network is not allowed in practice due to a constraint of switching hardware or a constraint on the protocol, the effect of the invention may be realized by performing emulation using a conventional network device.

Specifically, examples include a method using layer 2/layer 3 multicast. In general, the switch hardware may send a message only to an interface performing a join process without transmitting a multicast packet to an interface not performing a join process with respect to a multicast address through a multicast snooping process. In this instance, the multicast address may be regarded as a topic address, and sending to a specific topic address may be mapped to sending to a multicast address. In this instance, the transmission table corresponds to a multicast transmission table, and the transmission table update unit updates the transmission table by multicast join/leave. In practice, the multicast transmission table may be updated by transmission of a join message such as the Internet group management protocol (IGMP), multicast listener discovery (MLD), etc., and by alternative means.

In addition, another specific example is a method of substituting a topic address by a VLAN [IEEE802.1q] ID. However, in this case, the transmission table is implemented by a VLAN ID filter in each interface on the switch. Further, in this instance, a packet addressed to the VLAN ID filtered on the interface corresponding to normal implementation may not be received. When the VLAN filter process is divided into an ingress filter (a packet filter addressed to the switch) and an egress filter (a packet filter from the switch), and asymmetric filtering can be performed thereon, it is possible to realize the effects of the transmission table and the message transceiver of the invention by receiving a broadcast packet addressed to an arbitrary topic address in an arbitrary interface and resending the packet only to an interface associated with the corresponding topic address of the transmission table.

When a multicast address or a VLAN ID corresponding to the number of rows (the number of topic addresses) of the transmission table may not be used due to a constraint of the hardware of the switch, similar rows may be group and a plurality of rows may be grouped and treated by one multicast address or VLAN ID. In this case, a correspondence between the topic address and the multicast address needs to be reported to each computing device, and unnecessary transmission occurs with respect to grouped rows. However, the effects of the invention may be limitedly realized.

In the above embodiment, a description has been given of a case in which a single neural network such as the DNC is included in a single computing device. However, the invention is not limited thereto. Similar calculations may be performed even when a plurality of services share a single computing device as in a virtual environment in current cloud computing. Each virtual computing device may have a storage unit and generate reference processing information. The reference processing information may correspond to simple reference information in the example of the KVS or correspond to information included in a calculation graph as in the example of the DNC. In addition, the reference processing information may correspond to a computing cluster including a plurality of redundant services, and a neural network may be configured in message routing between redundant (substitutable) services.

What is claimed is:

1. A packet switch comprising:
a storage that stores a transmission table; and
a processor coupled to the storage and configured to:
determine a computing device to which a message is to be transmitted, with reference to the transmission table based on a topic address included in the message;
transmit the message to the computing device;
receive, from the computing device, reference processing information;
calculate compatibility of the transmission table based on the received reference processing information; and
update the transmission table based on the calculated compatibility of the transmission table, wherein
the reference processing information indicates a usage status of information corresponding to each topic address when the computing device performs calculation, and
the reference processing information includes use or nonuse of a message body corresponding to each topic address by the computing device.

2. The packet switch device according to claim 1, wherein the reference processing information includes information about an evaluation of a calculation process in the computing device, and
the processor is configured to calculate the compatibility of the transmission table based on the reference processing information including the information about the evaluation.

3. The packet switch device according to claim 1, wherein the processor is configured to cause a learning device according to a neural network to perform learning based on the reference processing information and calculate the compatibility of the transmission table using the learning device finishing learning.

4. The packet switch device according to claim 2, wherein the processor is configured to cause a learning device according to a neural network to perform learning based on the reference processing information and calculate the compatibility of the transmission table using the learning device finishing learning.

5. The packet switch device according to claim 1, wherein the message is transmitted to the computer device by using multicasting or broadcasting.

6. The packet switch device according to claim 1, wherein the reference processing information includes a flag indicating whether information referred to by the computing device is latest information.

7. The packet switch device according to claim 1, wherein the calculation of the compatibility is performed every preset period.

8. The packet switch device according to claim 1, wherein the reference processing information includes a gradient, and
calculation of the compatibility is performed based on the gradient.

9. The packet switch device according to claim 1, wherein the reference processing information has a log format.

10. The packet switch device according to claim 1, wherein the reference processing information is aggregated at constant time intervals.

11. A message exchange system comprising:
a plurality of computing devices; and
a packet switch device to which the plurality of computing devices is connected, wherein
a computing device of the plurality of computing devices is configured to:
receive a message from the packet switch device,
store, in a first storage, information used for a calculation process, the information corresponding to each topic address included in the message,
generate a usage status of the information stored in the first storage as reference processing information, and
transmit the reference processing information to the packet switch device, and
the packet switch device is configured to:
store, in a second storage, a transmission table
determine the computing device to which the message is to be transmitted, with reference to the transmission table based on a topic address included in the message, transmit the message to the computing device
  receive, from the computing device, reference processing information,
  calculate compatibility of the transmission table based on the received reference processing information, and
  update the transmission table based on the calculated compatibility of the transmission table, wherein
  the reference processing information indicates a usage status of information corresponding to each topic address when the computing device performs calculation, and
  the reference processing information includes use or nonuse of a message body corresponding to each topic address by the computing device.

12. The message exchange system according to claim 11, wherein
  the reference processing information includes information about an evaluation of a calculation process in the computing device, and
  the packet switch device is configured to calculate the compatibility of the transmission table based on the reference processing information about the evaluation.

13. The message exchange system according to claim 11, wherein the packet switch device is configured to cause a learning device according to a neural network to perform learning based on the reference processing information and calculates the compatibility of the transmission table using the learning device finishing learning.

14. The message exchange system according to claim 12, wherein the packet switch device is configured to cause a learning device according to a neural network to perform learning based on the reference processing information and calculates the compatibility of the transmission table using the learning device finishing learning.

15. The message exchange system device according to claim 11, wherein the message is transmitted to the computer device by using multicasting or broadcasting.

16. The message exchange system device according to claim 11, wherein the reference processing information includes a flag indicating whether information referred to by the computing device is latest information.

17. The message exchange system device according to claim 11, wherein the calculation of the compatibility is performed every preset period.

18. The message exchange system device according to claim 11, wherein
  the reference processing information includes a gradient, and
  the calculation of the compatibility is performed based on the gradient.

19. The message exchange system device according to claim 11, wherein the reference processing information has a log format.

20. A method for switching a packet, comprising:
  storing a transmission table in a storage;
  determining, by a processor, a computing device to which a message is to be transmitted, with reference to the transmission table based on a topic address included in the message;
  transmitting, by the processor, the message to the computing device;
  receiving, by the processor, from the computing device, reference processing information;
  calculating, by the processor, compatibility of the transmission table based on the received reference processing information; and
  updating, by the processor, the transmission table based on the calculated compatibility of the transmission table, wherein
  the reference processing information indicates a usage status of information corresponding to each topic address when the computing device performs calculation, and
  the reference processing information includes use or nonuse of a message body corresponding to each topic address by the computing device.

* * * * *